United States Patent
Islam et al.

(10) Patent No.: US 9,152,325 B2
(45) Date of Patent: Oct. 6, 2015

(54) LOGICAL AND PHYSICAL BLOCK ADDRESSING FOR EFFICIENTLY STORING DATA

(75) Inventors: Rezaul Shah Mohammad Islam, Tucson, AZ (US); Sandeep Ramesh Patil, Pune (IN); Riyazahamad Moulasab Shiraguppi, Pune (IN); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 470 days.

(21) Appl. No.: 13/558,481

(22) Filed: Jul. 26, 2012

(65) Prior Publication Data

US 2014/0032861 A1    Jan. 30, 2014

(51) Int. Cl.
| | | |
|---|---|---|
| G06F 3/06 | (2006.01) | |
| G06F 17/30 | (2006.01) | |
| G06F 11/14 | (2006.01) | |
| G06F 11/34 | (2006.01) | |

(52) U.S. Cl.
CPC ............ *G06F 3/0613* (2013.01); *G06F 3/0649* (2013.01); *G06F 3/0655* (2013.01); *G06F 3/0685* (2013.01); *G06F 17/30097* (2013.01); *G06F 17/30156* (2013.01); *G06F 3/0641* (2013.01); *G06F 3/0646* (2013.01); *G06F 11/1453* (2013.01); *G06F 11/3409* (2013.01); *G06F 11/3485* (2013.01); *G06F 2201/88* (2013.01)

(58) Field of Classification Search
CPC ............ G06F 11/3485; G06F 11/3409; G06F 2201/88; G06F 3/0641; G06F 17/30156
USPC ......................................................... 711/162
See application file for complete search history.

(56) References Cited

U.S. PATENT DOCUMENTS

| | | | |
|---|---|---|---|
| 6,442,664 B1* | 8/2002 | Maynard et al. | 711/203 |
| 7,822,939 B1 | 10/2010 | Veprinsky et al. | |
| 8,924,675 B1* | 12/2014 | Burke et al. | 711/165 |
| 2005/0223156 A1* | 10/2005 | Lubbers et al. | 711/100 |
| 2008/0082765 A1* | 4/2008 | Hily et al. | 711/154 |
| 2008/0162795 A1* | 7/2008 | Hsieh et al. | 711/103 |
| 2009/0204765 A1 | 8/2009 | Gupta et al. | |
| 2010/0095023 A1* | 4/2010 | Frank et al. | 709/245 |
| 2011/0191522 A1 | 8/2011 | Condict et al. | |
| 2011/0246430 A1 | 10/2011 | Prahlad et al. | |
| 2012/0005418 A1 | 1/2012 | Ribeiro et al. | |
| 2012/0016839 A1 | 1/2012 | Yueh | |

FOREIGN PATENT DOCUMENTS

WO        2010151813 A1     12/2010

* cited by examiner

*Primary Examiner* — Mardochee Chery
(74) *Attorney, Agent, or Firm* — Griffiths & Seaton PLLC

(57) ABSTRACT

One method includes assigning a pointer from multiple logical blocks to the same original physical block if the multiple logical blocks include the same data. The method further includes receiving a command to write data to the first logical block and determining if the first logical block is a frequently accessed logical block. If the first logical block is a frequently accessed logical block, ownership of the original physical block is assigned to the first logical block. If ownership is established, the method includes copying any data stored in the original physical block to a new physical block, assigning a pointer from a second logical block to the new physical block, and performing the write command on the original physical block. A system includes a processor for performing the above method. One computer program product includes computer code for performing the method described above.

20 Claims, 4 Drawing Sheets

LOGICAL AND PHYSICAL BLOCK ADDRESSING FOR EFFICIENTLY STORING DATA

BACKGROUND OF THE INVENTION

1. Field of the Invention

The present invention relates generally to computing systems, and more particularly to, systems and methods for efficiently storing data.

2. Description of the Related Art

Prior storage systems often use both cache memory and long-term memory to store and access data. Access speed is one goal of prior storage systems. One technique to increase access speed includes storing data that is frequently accessed in the cache memory because accessing data in cache memory is faster than accessing data in long-term memory. Another technique that increases access speed is data deduplication.

Data deduplication is a storage concept in which redundant data is eliminated to significantly shrink storage requirements and improve bandwidth efficiency in storage systems. While both of these techniques are effective in increasing access speed, latency can occur in storage systems that utilize both techniques.

SUMMARY OF THE INVENTION

Various embodiments provide systems for storing data. One system comprises a memory comprising a plurality of logical blocks and a plurality of physical blocks, and a processor coupled to the memory. In one embodiment, the processor is configured to point a first pointer from a first logical block to a first physical block, point a second pointer from a second logical block to the first physical block if the first logical block and the second logical block comprise the same data, and point the second pointer from the second logical block to a second physical block if the first logical block and the second logical block comprise different data.

In one embodiment, the processor further receives an input/output (I/O) command to write data to the first logical block and determines if the first logical block is a frequently accessed logical block. If the first logical block is a frequently accessed logical block, the processor assigns ownership of the physical block to the first logical block. In another embodiment, if the first logical block is a frequently accessed logical block, the processor copies any data stored in the first physical block to the second physical block, assigns the second pointer from the second logical block to the second physical block, and performs the first I/O command on the first physical block.

Other embodiments provide methods for storing data. One method comprises assigning a first pointer from a first logical block to a first physical block, assigning a second pointer from a second logical block to the first physical block if the first logical block and the second logical block comprise the same data, and assigning the second pointer from the second logical block to a second physical block if the first logical block and the second logical block comprise different data.

In one embodiment, the method further comprises receiving an input/output (I/O) command to write data to the first logical block and determining if the first logical block is a frequently accessed logical block. If the first logical block is a frequently accessed logical block, the method further comprises assigning ownership of the physical block to the first logical block. In another embodiment, if the first logical block is a frequently accessed logical block, the method further comprises copying any data stored in the first physical block to the second physical block, assigning the second pointer from the second logical block to the second physical block, and performing the first I/O command on the first physical block.

Physical computer storage mediums comprising a computer program product method for storing data are also provided. One physical computer-readable medium comprises computer code for assigning a first pointer from a first logical block to a first physical block, computer code for assigning a second pointer from a second logical block to the first physical block if the first logical block and the second logical block comprise the same data; and computer code for assigning the second pointer from the second logical block to a second physical block if the first logical block and the second logical block comprise different data.

In one embodiment, the physical computer-readable medium further comprises computer code for receiving an input/output (I/O) command to write data to the first logical block and computer code for determining if the first logical block is a frequently accessed logical block. The physical computer-readable medium further comprises computer code for assigning ownership of the physical block to the first logical block when the first logical block is a frequently accessed logical block. In another embodiment, the physical computer-readable medium further comprises computer code for copying any data stored in the first physical block to the second physical block, computer code for assigning the second pointer from the second logical block to the second physical block, and computer code for performing the first I/O command on the first physical block when the first logical block is a frequently accessed logical block.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods, systems, and physical computer storage mediums including a computer program product for efficiently storing data. One system comprises a memory comprising a plurality of logical blocks and a plurality of physical blocks, and a processor coupled to the memory. In one embodiment, the processor is configured to point a first pointer from a first logical block to a first physical block, point a second pointer from a second logical block to the first physical block, receive a first input/output (I/O) command to write data to the first logical block, and determine if the first logical block is a frequently accessed logical block. If the first logical block is identified as a frequently accessed logical block the processor is configured to assign ownership of the physical block to the first logical block, point the second pointer from the second logical block to a second physical block, and perform the first I/O command on the first physical block.

A method comprises pointing a first pointer from a first logical block to a first physical block, pointing a second pointer from a second logical block to the first physical block, receiving a first input/output (I/O) command to write data to the first logical block, and determining if the first logical block is a frequently accessed logical block. If the first logical block is identified as a frequently accessed logical block the method further comprises assigning ownership of the physical block to the first logical block, pointing the second pointer from the second logical block to a second physical block, and performing the first I/O command on the first physical block.

One physical computer-readable medium comprises computer code for pointing a first pointer from a first logical block to a first physical block, computer code for pointing a second pointer from a second logical block to the first physical block, and computer code for receiving a first input/output (I/O) command to write data to the first logical block. The physical computer-readable medium comprises further comprises computer code for determining if the first logical block is a frequently accessed logical block, computer code for assigning ownership of the physical block to the first logical block when the first logical block is a frequently accessed logical block, computer code for pointing the second pointer from the second logical block to a second physical block when the first logical block is a frequently accessed logical block, and computer code for performing the first I/O command on the first physical block.

Figure 1:
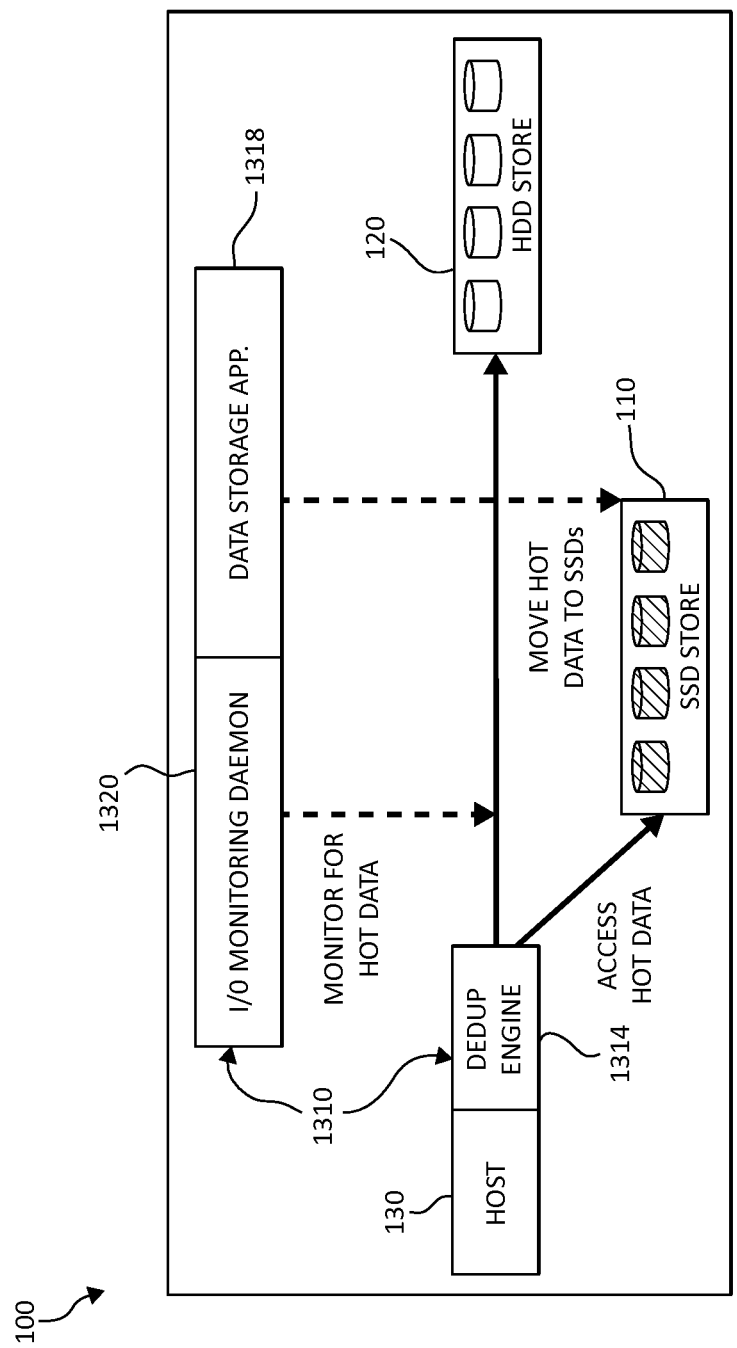
FIG. 1 is a block diagram of one embodiment of a storage system for efficiently storing data.

Turning now to the figures, FIG. 1 is a block diagram of one embodiment of a system 100 for efficiently storing data. At least in the illustrated embodiment, system 100 comprises a cache memory 110, long-term memory 120, and a host computing device 130.

Cache memory 110 may be any memory system and/or memory device capable of functioning as a cache memory. In various embodiments, cache memory 110 comprises a solid-state drive (SSD) that enables relatively quick access to data stored in cache memory 110, as compared to long-term memory 120.

Long-term memory 120 may be any non-volatile memory system and/or memory device capable of storing data. Examples of long-term memory 120 include, but are not limited to, disks (e.g., a hard disk drive (HDD) configured in a redundant array of independent disks (RAID) configuration, a just a bunch of disks (JBOD) configuration, etc.), optical disk drives, tape drives, and/or the like computer-readable storage mediums. Long-term memory 120 is configured to receive input/output commands (e.g., read commands and write commands) from host computing device 130.

Host computing device 130 may be any computing device capable of performing the functions (e.g., issuing I/O commands to cache memory 110 and long-term memory 120) of a host computing device. At least in the illustrated embodiment, host computing device 130 comprises a memory module 1310 coupled to a processor 1320.

Memory module 1310 comprises a data deduplication engine 1314 and a data storage application 1318. In one embodiment, data deduplication engine 1314 is configured to reduce and/or eliminate redundant data stored in cache memory 110 and/or long-term memory 120. In one embodiment, data deduplication engine 1314 in configured to perform "in-line" data deduplication.

When performing in-line data deduplication, data deduplication engine 1314 in configured to create, in real-time, hash calculations on cache memory 110 or long-term memory 120 (i.e., the target device) as data enters host computing device 130. When data deduplication engine 1314 identifies a block of data that is already stored in cache memory 110 or long-term memory 120, data deduplication engine 1314 does not store the new block, but instead, creates a reference (e.g., a pointer) to the existing block of data stored in cache memory 110 or long-term memory 120.

Data storage application 1318 is an application that identifies and categorizes the frequency with which data is accessed. For example, data that is frequently accessed may be referred to as "hot" data, while data that is less frequently accessed may be referred to as "cool" data.

In one embodiment, data storage application 1318 is a multi-tier storage application with SSD and HDD tiers. In various embodiments, data storage application 1318 provides insights into the storage workload and automates the placement of data amongst different storage tiers to achieve the optimal performance through a software, server, and/or storage solution. In one embodiment, data storage application 1318 dynamically relocates data across multiple storage tiers based on the data usage by placing "hot" data (e.g., data with a high I/O density and low response time requirements) in cache memory 110 so that this data may be more quickly accessed, while targeting long-term memory 120 for data that is accessed more sequentially and at lower I/O densities.

To identify and categorize the frequency with which data is accessed, data storage application 1318 comprises an I/O monitoring daemon 1320 that monitors for I/O operations performed on long-term memory 120. Based on the data access frequency, I/O monitoring daemon 1320 identifies data that is frequently accessed and places this "hot" data in cache memory 110 for high throughput, low response times and IOPS-energy-efficient characteristics. In this manner, data storage application 1318 provides a mix of drives (e.g. SSDs and HDDs) and the right data placement to achieve improved performance.

In storing data, data storage application 1318 nominates a frequently accessed logical block as the owner of a particular disk block while establishing a deduplication pointer relationship between an associated logical block and the particular disk block. When multiple logical blocks point to the same disk block, a new data write to the owner logical block results in a hash value being determined for the new data write. The hash value of the original data at the particular disk block is determined and the original data is copied to a new disk block. Next, any non-owner logical blocks pointing to the particular disk block are assigned to the new disk block and the particular disk block is updated with the new data write.

For non-owner logical blocks, data deduplication engine 1314 performs write operations on the other logical blocks. When multiple logical blocks include the same hash value, data deduplication engine 1314 determines a hash value for the new data write. Next, data deduplication engine 1314 determines if there are any disk blocks that include a hash value that matches the determined hash value for the new data write.

If a disk block includes the same hash value as the new data write, data deduplication engine 1314 assigns a pointer from the associated logical block to the disk block that includes the same hash value. If there are no disk blocks that include the same hash value as the new data write, data deduplication engine 1314 allocates a new disk block for the new data write, performs the write operation on the new disk block, and assigns a pointer from the associated logical block to the new disk block.

Processor 1320 may be any processor known in the art or developed in the future capable of executing memory module 1310. That is, processor 1320 is configured to perform the method illustrated in FIG. 2 when executing the computer code comprising memory module 1310.

Figure 2:
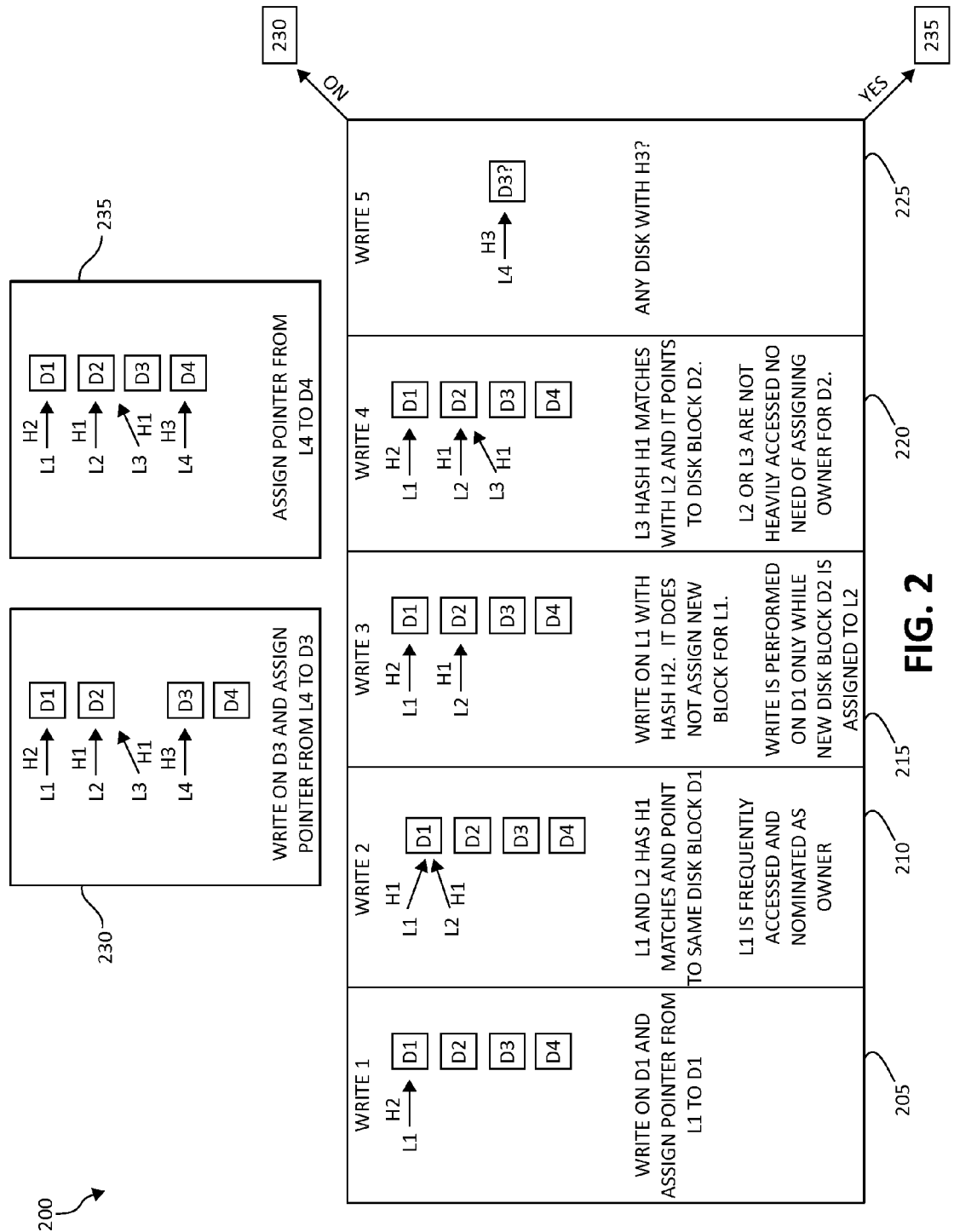
FIG. 2 is a block diagram of one embodiment of a method for efficiently storing data.

With reference now to FIG. 2, FIG. 2 illustrates one embodiment of a method 200 in which memory module 1310 utilizes data deduplication engine 1314 and data storage application 1318 to more efficiently store data. In block 205, data deduplication engine 1314 performs a first write (Write1) on a first logical block (L1). L1 comprises a first hash value (H1) that does not match any existing blocks of data stored in system 100 (e.g., cache memory 110 or long-term memory 120). A first disk block (D1), which is a new disk block, is allocated to L1 and a pointer from L1 to D1 is established.

Block 210 shows that a second write command (Write2) for a second logical block (L2) is received. Here, Write2 also includes the same hash value (i.e., H1) as L1 and a pointer from H2 to D1 is established.

When a third data write (Write3) is received and data storage application 1318 determines that L1 is a frequently accessed logical block (block 215), data storage application 1318 assigns L1 the owner of D1. The hash value (H2) for Write3 is calculated and the value of the data in D1 is determined. The data in D1 is then copied to a second disk block (D2) and a pointer from L2 to D2 is established. Data deduplication engine 1314 then performs Write3 on D1. At this point, D1 includes the data in Write3 and D2 includes the data in Write1 and Write2, which are the same.

Block 220 shows a fourth write command (Write4) received for a third logical block (L3). As illustrated, L3 also includes the same hash value H1 as L2 and a pointer from L3 to D2 is established. Here, data storage application 1318 determines that neither L2 nor L3 are frequently accessed logical blocks (i.e., comprise "cool" data) and D2 is not assigned an owner.

In block 225, data deduplication engine 1314 receives a fifth write (Write5) on L4. A new third hash value (H3), which is a new hash value, is determined for Write5. Data deduplication engine 1314 then determines if there are any disk blocks that include a hash value that matches H3.

If there are no disk blocks that include H3 (block 230), data deduplication engine 1314 allocates a disk block (D3) for L3, performs Write5 on D3, and assigns a pointer from L3 to D3. If a disk block (D4) includes H3 (block 235), data deduplication engine 1314 assigns a pointer from L3 to D4.

The above manner of assigning logical blocks to disk blocks and writing data to the logical blocks ensures that write operations are performed on the assigned disk blocks instead of remapping to a new disk block for every write operation. In other words, write operations on L1 (i.e., a frequently accessed logical block) goes on the same disk block (i.e., D1) every time, which enables data storage application 1318 to determine that L1 is a "hot" data block and store L1 in cache memory 110.

Alternatively, write operations on L2 and L3 (i.e., non-frequently accessed logical blocks) go to different disk blocks (i.e., D2 and D3), which enables data storage application 1318 to determine that L2 and L3 are "cool" data blocks and to not store L2 and L3 in cache memory 110. That is, L2 and L3 are stored in long-term memory 120.

Notably, system 100 does not require that every disk block be assigned an owner. As shown in block 220, D2 and D3 are not assigned an owner because L2 and L3 are not "hot" data blocks.

Considering the implementation, assignment of an owner can be done either by data storage application 1318 or data deduplication engine 1314. Data storage application 1318 may be file system or volume/block manager that is working at a logical block level and interacting with data deduplication engine 1314.

When data storage application 1318 is nominating the owner, data deduplication engine 1314 is configured to export an API that allows data storage application 1318 to mark a logical block as the owner for a particular disk block. Data storage application 1318 determines logical blocks that are frequently accessed and uses this API to assign the particular logical block as the owner of the disk block mapped to it.

Alternatively, instead of new API, reserved fields of a write request header may be used to communicate ownership information. That is, data storage application 1318 may over nominate a number of owner blocks. In this case data deduplication engine 1314 is configured to maintain a count of the I/Os issued to the owner blocks and if the count is not up to a predetermined threshold, ownership is removed.

When nomination of the owner is performed by data deduplication engine 1314, data deduplication engine 1314 keeps track of the logical blocks whose mapping is frequently changed due to I/O operations and assigns each of these logical blocks as an owner of separate disk blocks. This decision may also be taken in runtime in which, for a given write request on, for example, L1, data deduplication engine 1314 can decide whether to keep the same disk block for the L1 or assign a new disk block to L1. For monitoring, data deduplication engine 1314 may maintain local counts in metadata or utilize existing I/O monitoring utilities (e.g., a monitoring daemon).

In a scenario in which two owners exist for multiple data blocks with the same hash value, data deduplication engine 1314 is configured to assign separate disk blocks to each of the owners. In this situation, data deduplication engine 1314 is configured to make the changes in the existing logic so that two disk blocks do not share the same hash value.

Figure 3:
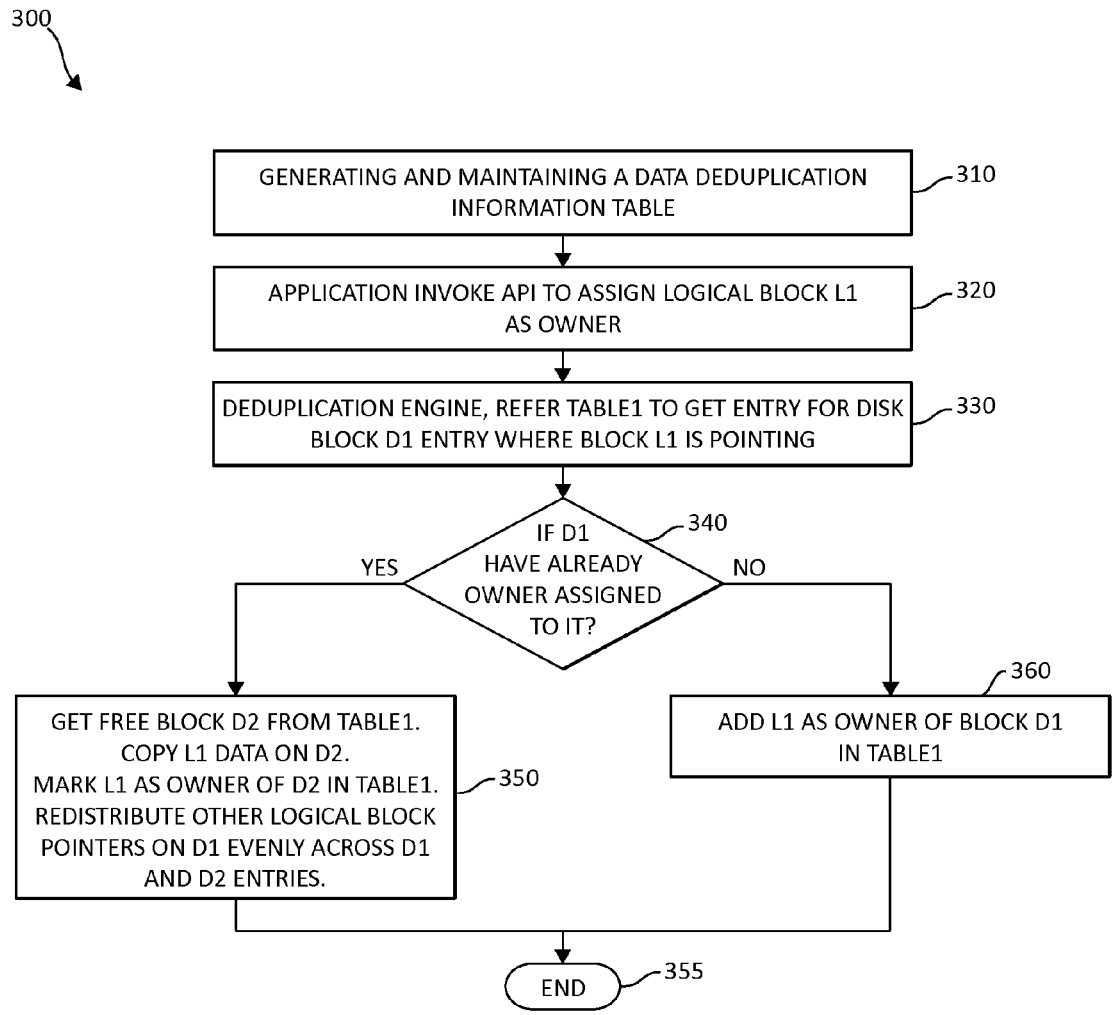
FIG. 3 is a flow diagram of one embodiment of a method for efficiently storing data.

FIG. 3 is a flow diagram of one embodiment of a method 300 for efficiently storing data. At least in the illustrated embodiment, method 300 begins by generating and maintaining a data deduplication information table (e.g., table 1) (block 310). For example, data deduplication engine 1314 generates and maintains table 1 to keep information about logical blocks pointing to a given disk block.

TABLE 1

Data Deduplication Information Table

| DiskBlock | Status | HashValue | LogicalBlock Pointers | OwnerLogical Block |
|---|---|---|---|---|
| 0 | Allocated | 017a89abc | L1, L2, L3 | L1 |
| 1 | Allocated | 12bc67ef3 | L4, L5 | . . . |
| 2 | Freed | . . . | . . . | . . . |
| 3 | Allocated | 67bc45bba | L6 | L6 |
| 4 | Allocated | 12bc67ef3 | L7, L8 | L8 |
| 5 | Freed | . . . | . . . | . . . |

The data deduplication information table includes a column identifying each disk block, a column for indicating the status of each disk block, a column indicating the hash value of each disk block, and a column showing one or more pointers to each disk block. table 1 further comprises a column that is utilized to mark a logical block as the owner for a given disk block.

In one embodiment, data deduplication engine 1314 is expected to export API to data storage application 1318 that assigns a particular logical block as owner of a disk block. Data storage application 1318 may then use this API during a write request. Alternatively, a reserved field of a Write request header can be used to communicate this information.

Based on block usage, data storage application 1318 assigns a frequently accessed logical block (e.g., L1) as the owner of a disk block (e.g., D1) (block 320). In one embodiment, data storage application 1318 invokes a data deduplication API to mark the logical block L1 as the owner of disk block D1. Alternatively, based on access logs, data deduplication engine 1314 assigns the logical block L1 as the owner of the disk block D1.

In assigning logical block L1 as the owner, data storage application 1318 or data deduplication engine 1314 refers to data deduplication information table 1 to get an entry for disk block D1 where logical block L1 is pointing (block 330) to determine if disk block D1 has an owner already assigned to it (block 340). If yes, data storage application 1318 or data deduplication engine 1314 chooses a free disk block (e.g., D2) from data deduplication information table 1, copies logical block L1 data disk block D2, assigns logical block L1 as the owner of disk block D2, and redistributes any other logical block pointers to disk block D1 evenly across disk block D1 and disk block D2 (block 350). Method 300 then ends (block 355).

If no, data storage application 1318 or data deduplication engine 1314 assigns logical block L1 as the owner of disk block D1 in data deduplication information table 1 (block 360). Method 300 then ends (block 355).

Figure 4:
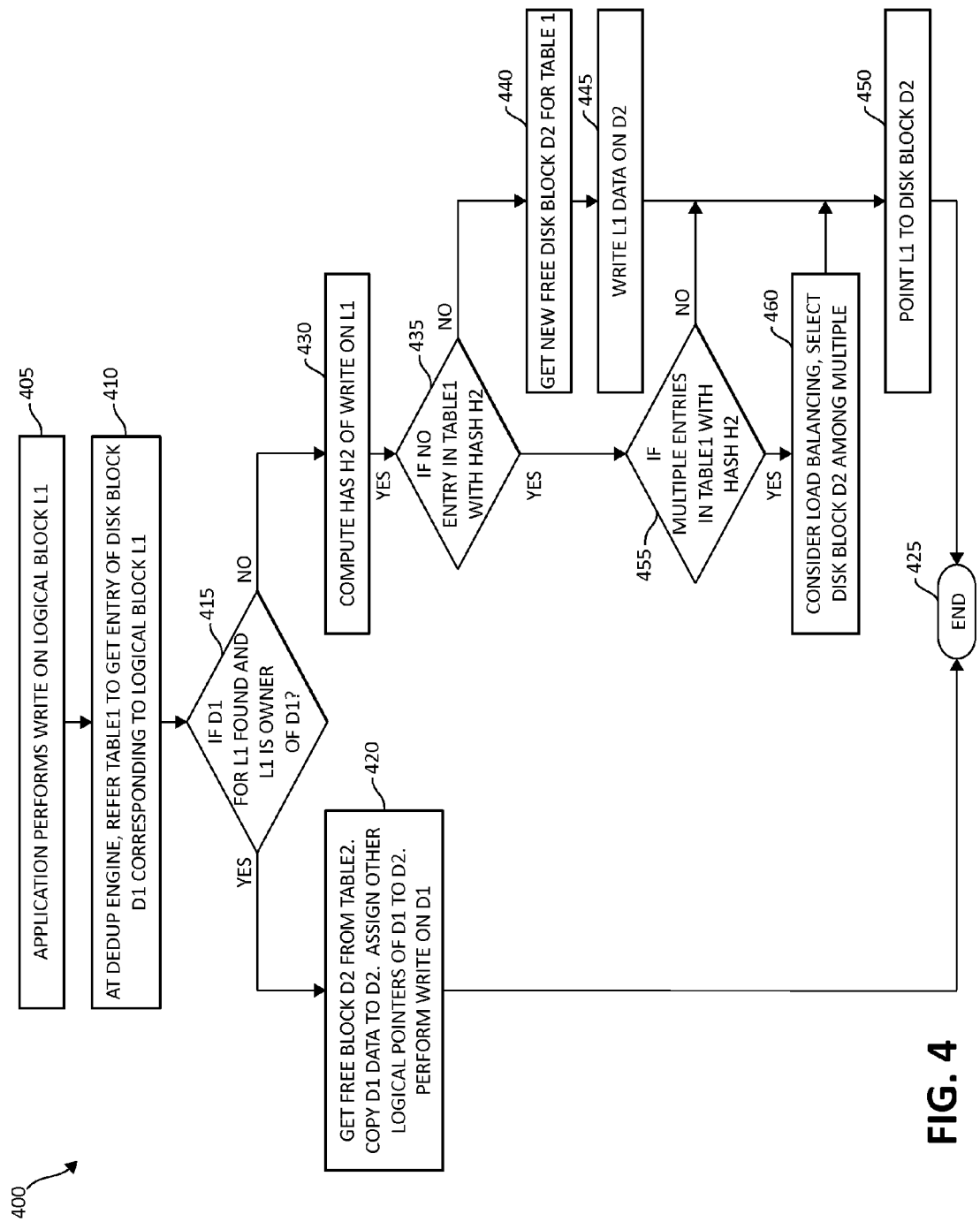
FIG. 4 is a flow diagram of one embodiment of a method for writing data.

With reference now to FIG. 4, FIG. 4 is a flow diagram of one embodiment of a method 400 for writing data. At least in the illustrated embodiment, method 400 begins by data storage application 1318 performing a write command on a logical block (e.g., L1) (block 405).

Method 400 next includes data deduplication engine 1314 using data deduplication information table 1 to look up an entry of a disk block (e.g., D1) corresponding to logical block L1 (block 410) to determine if disk block D1 for logical block L1 found and if logical block L1 is the owner of disk block D1 (block 415). If yes, a free disk block (e.g., D2) is obtained from data deduplication table 1, the data in disk block D1 is copied to disk block D2, any logical pointers to disk block D1 are assigned to disk block D2, and the write operation is performed on disk block D1 (block 420). Method 400 then ends (block 425).

If no, a new hash value (e.g., H2) is computed for logical block L1 (block 430). Next, method 400 includes determining if hash value H2 matches with any of the entries in data deduplication information table 1 (block 435).

If no, a new free disk block (e.g., D2) is obtained from data deduplication information table 1 (block 440), a write operation is performed on disk block D2 (block 445), and a pointer from logical block L1 to disk block D2 is assigned (block 450). Method 400 then ends (block 425).

If yes, method 400 determines if there are multiple entries with hash value H2 in data deduplication information table 1 (block 455). If no, a pointer from logical block L1 to disk block D2 is assigned (block 450) and method 400 ends (block 425).

If yes, disk block D2 is selected from amongst multiple entries based on load balancing considerations (block 460) and a pointer from logical block L1 to disk block D2 is assigned (block 450). Method 400 then ends (block 425).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical processor, a magnetic processor, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for storing data, comprising:
a memory comprising a plurality of logical blocks and a plurality of physical blocks; and
a processor coupled to the memory, wherein the processor:
assigns a first pointer from a first logical block to a first physical block,
assigns a second pointer from a second logical block to the first physical block if the first logical block and the second logical block comprise the same data, and
assigns the second pointer from the second logical block to a second physical block if the first logical block and the second logical block comprise different data.

2. The system of claim 1, wherein the first logical block and the second logical block comprise the same data and wherein the processor:
receives an input/output (I/O) command to write data to the first logical block, and
determines if the first logical block is a frequently accessed logical block, wherein if the first logical block is a frequently accessed logical block the processor is further configured to assign ownership of the physical block to the first logical block.

3. The system of claim 2, wherein if the first logical block is a frequently accessed logical block and wherein the processor:
copies any data stored in the first physical block to the second physical block;
assigns the second pointer from the second logical block to the second physical block; and
performs the first I/O command on the first physical block.

4. The system of claim 3, wherein the processor:
calculates a first hash value for the first logical block;
calculates a second hash value for the second logical block;
receives an input/output (I/O) command to write data to a third logical block;
calculates a third hash value for the I/O command;
assigns a third pointer from the third logical block to the second physical block if the second hash value and the third hash value are the same value; and
assigns the third pointer from the third logical block to a third physical block if the second hash value and the third hash value are different values.

5. The system of claim 1, wherein the first logical block and the second logical block comprise the same data and wherein the processor:
receives an input/output (I/O) command to write data from a third logical block to the first logical block;
calculates a hash value for the I/O command; and
determines if another physical block comprises the same hash value.

6. The system of claim 5, wherein another physical block comprises the same hash value and wherein the processor:
assigns a third pointer from the third logical block to the other physical block comprising the same hash value; and
performs the I/O command on the other physical block.

7. The system of claim 5, wherein another physical block does not comprise the same hash value and wherein the processor assigns a third pointer from the third logical block to the first physical block.

8. A method for storing data, comprising:
assigning a first pointer from a first logical block to a first physical block;
assigning a second pointer from a second logical block to the first physical block if the first logical block and the second logical block comprise the same data; and
assigning the second pointer from the second logical block to a second physical block if the first logical block and the second logical block comprise different data.

9. The method of claim 8, wherein the first logical block and the second logical block comprise the same data, the method further comprising:
receiving an input/output (I/O) command to write data to the first logical block; and
determining if the first logical block is a frequently accessed logical block, wherein if the first logical block is a frequently accessed logical block the processor is further configured to assign ownership of the physical block to the first logical block.

10. The method of claim 9, wherein the first logical block is a frequently accessed logical block, the method further comprising:
copying any data stored in the first physical block to the second physical block;
assigning the second pointer from the second logical block to the second physical block; and
performing the first I/O command on the first physical block.

11. The method of claim 10, further comprising:
calculating a first hash value for the first logical block;
calculating a second hash value for the second logical block;
receiving an input/output (I/O) command to write data to a third logical block;
calculating a third hash value for the I/O command;
assigning a third pointer from the third logical block to the second physical block if the second hash value and the third hash value are the same value; and
assigning the third pointer from the third logical block to a third physical block if the second hash value and the third hash value are different values.

12. The method of claim 8, wherein the first logical block and the second logical block comprise the same data, the method further comprising:
receiving an input/output (I/O) command to write data from a third logical block to the first logical block;
calculating a hash value for the I/O command; and
determining if another physical block comprises the same hash value.

13. The method of claim 12, wherein another physical block comprises the same hash value, the method further comprising:
assigning a third pointer from the third logical block to the other physical block comprising the same hash value; and
performing the I/O command on the other physical block.

14. The method of claim 12, wherein another physical block does not comprise the same hash value, the method further comprising assigning a third pointer from the third logical block to the first physical block.

15. A physical computer storage medium comprising a computer program product method for storing data, the physical computer-readable medium comprising:
computer code for assigning a first pointer from a first logical block to a first physical block;
computer code for assigning a second pointer from a second logical block to the first physical block if the first logical block and the second logical block comprise the same data; and
computer code for assigning the second pointer from the second logical block to a second physical block if the first logical block and the second logical block comprise different data.

16. The physical computer storage medium of claim 15, wherein the first logical block and the second logical block comprise the same data, the physical computer-readable medium further comprising:
computer code for receiving an input/output (I/O) command to write data to the first logical block; and
computer code for determining if the first logical block is a frequently accessed logical block, wherein if the first logical block is a frequently accessed logical block the processor is further configured to assign ownership of the physical block to the first logical block.

17. The physical computer storage medium of claim 16, wherein the first logical block is a frequently accessed logical block, the physical computer-readable medium further comprising:
computer code for copying any data stored in the first physical block to the second physical block;
computer code for assigning the second pointer from the second logical block to the second physical block; and
computer code for performing the first I/O command on the first physical block.

18. The physical computer storage medium of claim 17, further comprising:
computer code for calculating a first hash value for the first logical block;
computer code for calculating a second hash value for the second logical block;
computer code for receiving an input/output (I/O) command to write data to a third logical block;
computer code for calculating a third hash value for the I/O command;
computer code for assigning a third pointer from the third logical block to the second physical block if the second hash value and the third hash value are the same value; and
computer code for assigning the third pointer from the third logical block to a third physical block if the second hash value and the third hash value are different values.

19. The physical computer storage medium of claim 15, wherein the first logical block and the second logical block comprise the same data, the physical computer-readable medium further comprising:
computer code for receiving an input/output (I/O) command to write data from a third logical block to the first logical block;
computer code for calculating a hash value for the I/O command; and
computer code for determining if another physical block comprises the same hash value.

20. The physical computer storage medium of claim 19, further comprising:
computer code for assigning a third pointer from the third logical block to the other physical block comprising the same hash value and computer code for performing the I/O command on the other physical block if another physical block comprises the same hash value; and
computer code for assigning a third pointer from the third logical block to the first physical block if another physical block does not comprise the same hash value.

* * * * *